United States Patent
Morton (10) Patent No.: US 10,578,752 B2
(45) Date of Patent: *Mar. 3, 2020

(54) MULTIPLE ENERGY DETECTOR

(71) Applicant: Rapiscan Systems, Inc., Torrance, CA (US)

(72) Inventor: Edward James Morton, Guildford (GB)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,147

(22) Filed: Nov. 6, 2018

(65) Prior Publication Data

US 2019/0353803 A1    Nov. 21, 2019

Related U.S. Application Data

(63) Continuation of application No. 15/058,802, filed on Mar. 2, 2016, now Pat. No. 10,156,642.

(Continued)

(51) Int. Cl.
*G01T 1/20* (2006.01)
*G01T 1/208* (2006.01)
*G01T 1/202* (2006.01)

(52) U.S. Cl.
CPC ............ *G01T 1/208* (2013.01); *G01T 1/20* (2013.01); *G01T 1/2018* (2013.01); *G01T 1/2023* (2013.01)

(58) Field of Classification Search
CPC ..... G01T 1/208; G01T 1/2018; G01T 1/2023; G01T 1/20
See application file for complete search history.

(56) References Cited

U.S. PATENT DOCUMENTS 6,408,050 B1 * 6/2002 Han .................... G01T 1/17 378/98.11
7,858,917 B2   12/2010 Stern
(Continued)

FOREIGN PATENT DOCUMENTS

WO    2008087385    7/2008
WO    2014107675    7/2014
(Continued)

OTHER PUBLICATIONS

Fabrizio Guerrieri et al: "Two-Dimensional SPAD Imaging Camera for Photon Counting", IEEE Photonics Journal, IEEE, USA, vol. 2, No. 5, Oct. 1, 2010, pp. 759-774, XP011485000, ISSN: 1943-0655, DOI: 10.1109/JPHOT.2010. 2066554.

(Continued)

*Primary Examiner* — Kiho Kim
(74) *Attorney, Agent, or Firm* — Novel IP (57) ABSTRACT

The present specification describes an improved multi-energy radiation detector. In one embodiment, the signal generated by the detection medium is converted to digital form directly at the point of signal collection. This avoids the need for power intensive high bandwidth amplifiers and analog-to-digital converters, as it integrates the sensing device and signal processing onto the same silicon substrate to reduce the number of components in the system. In one embodiment, a single photon avalanche diode (SPAD) is coupled directly to a threshold detector to achieve an intrinsically low power and low noise detector.

13 Claims, 7 Drawing Sheets

Related U.S. Application Data (60) Provisional application No. 62/128,293, filed on Mar. 4, 2015.

(56) References Cited

U.S. PATENT DOCUMENTS

| | | | |
|---|---|---|---|
| 8,232,514 B2 | 7/2012 | Grund | |
| 8,439,565 B2 | 5/2013 | Mastronardi | |
| 8,503,606 B2 | 8/2013 | Rothschild | |
| 8,552,722 B2 | 10/2013 | Lionheart | |
| 8,690,427 B2 | 4/2014 | Mastronardi | |
| 8,723,132 B2* | 5/2014 | Baeumer | G01T 1/2018 250/370.11 |
| 8,884,236 B2 | 11/2014 | Rothschild | |
| 8,903,045 B2 | 12/2014 | Schubert | |
| 8,971,487 B2 | 3/2015 | Mastronardi | |
| 9,285,488 B2 | 3/2016 | Arodzero | |
| 9,310,323 B2 | 4/2016 | Bendahan | |
| 9,535,019 B1 | 1/2017 | Rothschild | |
| 9,557,427 B2 | 1/2017 | Bendahan | |
| 9,625,606 B2 | 4/2017 | Bendahan | |
| 9,658,343 B2 | 5/2017 | Arodzero | |
| 9,714,920 B2 | 7/2017 | Lionheart | |
| 9,823,383 B2 | 11/2017 | Hanley | |
| 9,891,314 B2 | 2/2018 | Morton | |
| 2006/0168793 A1* | 8/2006 | Stellari | G01R 31/311 29/593 |
| 2015/0144797 A1* | 5/2015 | Dolinsky | H01L 31/102 250/366 |
| 2017/0315242 A1 | 11/2017 | Arodzero | |
| 2017/0350863 A1 | 12/2017 | Lionheart | |

FOREIGN PATENT DOCUMENTS

| | | |
|---|---|---|
| WO | 2014173644 A1 | 10/2014 |
| WO | 2015004471 | 1/2015 |
| WO | 2015057973 | 4/2015 |
| WO | 2015134802 | 9/2015 |

OTHER PUBLICATIONS

International Search Report for PCT/2016/020421, dated Jun. 20, 2016.

\* cited by examiner

MULTIPLE ENERGY DETECTOR

CROSS-REFERENCE

The present application is a continuation application of U.S. patent application Ser. No. 15/058,802, entitled "Multiple Energy Detector" and filed on Mar. 2, 2016, which relies on U.S. Patent Provisional Application No. 62/128,293, entitled "Multi-Energy Detector" and filed on Mar. 4, 2015, for priority. The above-mentioned applications are herein incorporated by reference in their entirety.

FIELD

The present specification generally relates to the field of radiant energy imaging systems, and more specifically to a system that uses multiple energies for detecting concealed objects and identifying materials of interest.

BACKGROUND

X-ray imaging is widely deployed in various fields including medical imaging, security screening and industrial non-destructive testing. The following discussion is focused on security screening although the same approach applies to all other X-ray inspection fields.

Radiographic images are produced by the detection of radiation that is transmitted through or scattered from the object being inspected. The density, atomic number and the total amount of material that is present determine the extent of attenuation of the radiation and, therefore, the nature and type of radiographic image produced. In addition to determining the average absorption of the X-ray or gamma-ray photons as they travel along the various X-ray paths, it is possible to derive information about the characteristics of the material. The intensity of scattered X-rays is related to the atomic number (Z) of the material scattering the X-rays. In general, for atomic numbers less than 25, the intensity of X-ray backscatter, or X-ray reflectance, decreases with increasing atomic number. On the other hand, materials with high atomic number (Z>70) are characterized by high attenuation of the low and high end of the X-ray spectrum. Therefore, X-ray images are primarily modulated by variations in the atomic number of items of various materials inside an object (such as within cargo).

As a result of the image modulation according to atomic numbers of various materials, it is common for X-ray imaging systems to produce images with dark areas. Although these dark areas might indicate presence of threat materials, they yield little information about the exact nature of threat. Also, radiographs produced by conventional X-ray systems are often difficult to interpret because objects are superimposed and may confound the image. Therefore, a trained operator must study and interpret each image to render an opinion on whether or not a target of interest, such as a threat, is present. Operator fatigue and distraction can compromise detection performance when a large number of such radiographs are to be interpreted, such as at high traffic transit points and ports. Even with automated systems, it becomes difficult to comply with the implied requirement to keep the number of false alarms low, when the system is operated at high throughputs.

One method of obtaining more useful information and clarity from X-ray imaging is using dual energy systems to measure the effective atomic numbers of materials in containers or luggage. Here, the X-ray beam is separated into two broad categories: low energy and high energy. Often this is achieved by passing the X-ray beam through a first thin X-ray detector that responds preferentially to low-energy X-radiation. This filtered beam is then passed to a second detector which responds to the filtered beam which is weighted towards the higher energy part of the spectrum. Effective atomic number is then determined by taking the difference between the high energy and low energy signals. This is particularly effective for X-ray energy beams in the range of 60 kV to 450 kV where the rapid change in the linear attenuation coefficient of the object under inspection yields good contrast between the low and high energy spectral regions.

An alternative technique uses one X-ray detector per imaging pixel, however, varying the beam quality projected from the source as a function of time. Typically, this technique is used in high energy inspection systems (e.g. 4 MV and 6 MV beams). Since the effective atomic number is now generated from the high energy part of the spectrum, it is able to provide information over much thicker regions of the object than is possible with the dual energy, stacked detector, approach.

A further approach recognizes that the X-ray beam comprises multiple individual X-ray photons which interact with the detector material at different, randomly dispersed, moments in time. By detecting and processing each interacting X-ray photon separately, it is possible to build an energy spectrum of all the interacting X-rays, where this spectrum contains many discrete energy bins, typically in a range of 2 to at least 4 bins. It is then possible to analyze the shape of this spectrum to determine effective atomic number of the objects under inspection. Commonly known detection systems use scintillator and semiconductor materials to generate such radiation spectra.

Such spectral sensing systems generally are very expensive to procure since they combine several individual components including, but not limited to, detector material, analog signal processing circuits, analog to digital converters, digital signal processing circuits and digital data acquisition circuits. These circuits tend to be of high bandwidth in order to achieve the designed counting rates, typically up to 100 million counts per second per square millimeter, and thus are power hungry and space consuming. The systems also tend to have poor manufacturing yield and are often sensitive to changes in ambient temperature, particularly due to leakage current variation with temperature in the detecting materials.

Accordingly, there is a need for improved multiple energy detectors that are less power intensive and space consuming. There is further a need for detectors that not only reduce the cost and improve manufacturing yield, but are also able to mitigate against temperature variations.

SUMMARY

The present specification describes an improved multi-energy radiation detector, which acts as a direct to digital sensor. In one embodiment, a low cost sensor is described in which the signal generated by the detection medium is converted to digital form directly at the point of signal collection. This avoids the need for power intensive high bandwidth amplifiers and analog-to-digital converters, as it integrates the sensing device and signal processing onto the same silicon substrate to reduce the number of components in the system. This reduces cost and improves the manufacturing yield, and also provides mitigation against temperature variation by being an intrinsically digital detection method.

In one embodiment, when the direct to digital sensor detects an optical photon, it generates a corresponding digital pulse. In one embodiment, a single photon avalanche diode (SPAD) is coupled directly to a threshold detector to achieve a direct to digital sensor, which provides an intrinsically low power and low noise detector.

In some embodiments, the present specification discloses a multi-energy detector for detecting incident radiation, comprising: a scintillator material adapted to convert the incident radiation into a plurality of optical photons; an array of pixel circuits, wherein each pixel circuit comprises a single photon avalanche diode (SPAD) coupled to a threshold detector, wherein each SPAD is optically coupled to the scintillator material and adapted to generate a current in response to detecting one or more optical photons, and a threshold detector in electrical communication with the SPAD, wherein the threshold detector configured to generate a digital pulse in response to said current; and processing electronics for processing the digital pulse from each pixel circuit in said array of pixel circuits and converting said digital pulse into an energy profile of the incident radiation.

Optionally, each of said pixel circuits further comprises an active quench circuit, wherein the active quench circuit is configured to reset said SPAD.

Optionally, the scintillator material is LYSO crystal.

Optionally, said array of pixel circuits and said processing electronics are fabricated on a single CMOS substrate.

Optionally, said processing electronics includes an accumulator configured to generate a pixel count wherein said pixel count is transmitted to a latching register. Optionally, said latching register is configured to receive said pixel count from said accumulator, store said pixel count, and send said pixel count to a digital buffer. Optionally, said digital buffer is configured to receive said pixel count from said latching register, buffer said pixel count, and send said buffered pixel count to a digital pulse processor. Optionally, said digital pulse processor is configured to receive said buffered pixel count from said digital buffer, find a specific energy value, and send said energy value to a range shifter. Optionally, said range shifter is configured to receive said energy value from said digital pulse processor, scale said energy value, and send said scaled energy value to a histogrammer. Optionally, said histogrammer is configured to receive said scaled energy value from said range shifter, generate a histogram of said scaled energy value to create energy spectrum data, and send said energy spectrum data to a serializer. Optionally, said serializer is configured to receive said energy spectrum data from said histogrammer and pass said energy spectrum data to an external device for signal analysis and image display. Optionally, said digital pulse processor is configured to find a specific energy value by searching time sequence data to find an X-ray pulse and its associated pulse height, wherein the pulse height represents a corresponding energy level.

In some embodiments, the multi-energy detector may further comprise a clock, which is used to drive said array of pixel circuits and said processing electronics. Optionally, the frequency of the clock is varied to vary the gain of said multi-energy detector. Optionally, the frequency of the clock is in the range of 100 MHz to 500 MHz.

In some embodiments, the present specification discloses a sensor for detecting incident photons comprising a single photon avalanche diode (SPAD) coupled with a threshold detector for generating a signal upon detection of an optical photon by the SPAD, the SPAD being configured as a solid state photodetector in which a single photon can cause sufficient ionization to trigger a measurable avalanche current.

Optionally, the SPAD is coupled with a scintillator material for detecting a photon by generating a corresponding electrical current. Optionally, the scintillator material is one of $Lu_{1.8}Y_{0.2}SiO_5(Ce)$ (LYSO), lutetium oxyorthosilicate (LSO), gadolinium oxyorthosilicate (GSO), and lanthanum Bromide (LaBr).

Optionally, the sensor further comprises a pair of flip flop latches, wherein a signal generated by the threshold detector is fed to the pair of flip flop latches for obtaining a corresponding digital pulse.

Optionally, the threshold detector is a field effect transistor (FET) which is configured to change state as a result of a charge injection from the SPAD.

Optionally, the sensor further comprises an active quench circuit coupled with the SPAD, wherein the active quench circuit is adapted to reset the SPAD after a detection of a photon.

Optionally, the SPAD, scintillator material, threshold detector, and active quench circuit are all fabricated on a single CMOS substrate.

The aforementioned and other embodiments of the present shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

The present specification describes an improved multiple energy radiation detector, which acts as a direct to digital sensor. In one embodiment, a low cost sensor is described in which the signal generated by the detection medium is converted to digital form directly at the point of signal collection. This avoids the need for power intensive high bandwidth amplifiers and analog-to-digital converters, as it integrates the sensing device and signal processing onto the same silicon substrate to reduce the number of components in the system. This reduces cost and improves the manufacturing yield, and also provides mitigation against temperature variation by being an intrinsically digital detection method.

In one embodiment, when the direct to digital sensor detects an optical photon, it generates a corresponding digital pulse. In one embodiment, a single photon avalanche diode (SPAD) is coupled directly to a threshold detector to achieve a direct to digital sensor.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

Figure 1:
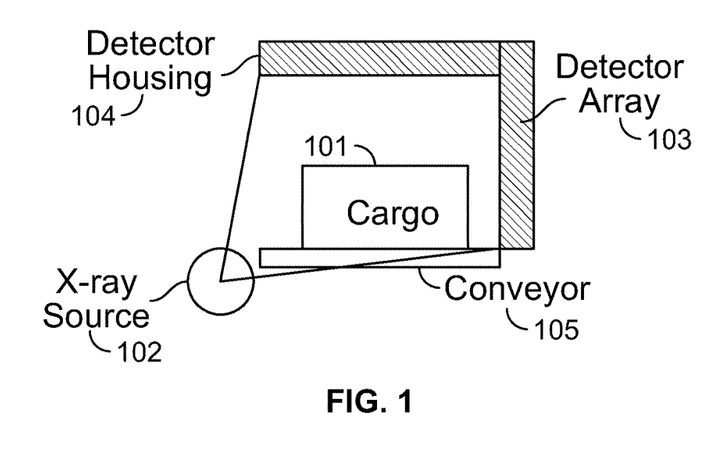
FIG. 1 is a schematic diagram of a multiple energy scanning system.

FIG. 1 illustrates an overview of a multi-energy scanning system. Referring to FIG. 1, the cargo 101 under inspection moves through a fan-beam of X-rays that are generated by an X-ray source 102. In one embodiment, X-rays are generated at energies in the range 10 keV to 450 keV. In the present example, a conveyer 105 is used to move the cargo 101 through the fan beam. It may be appreciated, however, that multi-energy scanning systems may be used for non-conveyer based systems as well. X-rays that have been attenuated by the cargo continue towards a set of X-ray detector elements that are built into pixelated linear detector array segments which may be referred to as a detector array 103. In one embodiment, several such segments are arranged to cover the full length of the fan beam with minimal overlap between segments. In one embodiment, each segment is between 50 mm and 200 mm in length. The detector arrays are fixed within one or more detector housings 104 which provide a light tight enclosure and also protect the detectors against moisture.

The detector elements are designed to be able to detect the energy of each X-ray photon as it interacts in the detector material. Several detector materials may be envisaged for use in this scenario, examples being scintillators such as $Lu_{1.8}Y_{0.2}SiO_5(Ce)$ (LYSO), lutetium oxyorthosilicate (LSO), gadolinium oxyorthosilicate (GSO), lanthanum Bromide (LaBr) and other fast decay time, high light output, materials, or room temperature semiconductors such as CdTe or CdZnTe. The energy of the detected X-ray determines the number of signal carriers produced in the detector material during the X-ray interaction. One of ordinary skill in the art would appreciate that signal carriers are optical photons in the case of a scintillator and electrons in the case of a semiconductor. It may also be appreciated that the higher the deposited X-ray energy, the more signal carriers that are produced. By counting the number of signal carriers produced in each X-ray interaction and then histogramming this count value for each X-ray arriving over a specified time period (generally in the range 1 to 100 ms), an X-ray energy spectrum is obtained. The energy spectrum is characteristic of both the source emission spectrum and the X-ray attenuation coefficient as a function of energy of the materials of the cargo under inspection. Since the X-ray spectrum does not change materially between one scan and another, the detected signal is characteristic of the materials only.

By analysis of the fraction of the absorbed X-ray energy present in each region of the energy spectrum, it is possible to generate a characteristic of the material under inspection. Such an analysis can be taking a ratio between the counts in a high energy part of the spectrum to the counts in a low energy part of the spectrum—the larger this ratio, the higher the atomic number of the material(s) under inspection. More sophisticated algorithms extend this type of analysis to multiple energy regions and to area-averaging to increase the number of detected photons considered in the analysis, thereby improving the signal-to-noise ratio.

Once the atomic number of a material has been determined from the image data, the result may be passed through a classifier in order to determine the presence of threat materials such as explosives, narcotics or currency. In this way an automatic detection capability can be developed for threat materials. As the accuracy in the determination of atomic number improves, the performance of the threat detection system also gets better.

One of ordinary skill in the art would appreciate that such an automated detection system is then advantageously coupled with other security screening technology, such as technology to screen people for the presence of explosives, weapons and other threat materials and devices. The results from these independent screening systems may then be combined to generate an aggregate threat detection result that provides further information about the overall threat posed—for example but not limited to, explosive material in a bag and detonating device in a pocket.

Spectral detectors have previously used a common approach whereby the detected signal—either detected directly by a semiconducting material or indirectly by a scintillator coupled to a light detecting device such as a photodiode or silicon photomultiplier—is fed to a charge sensitive amplifier, a shaping amplifier, an analog to digital converter, a digital histogramming unit and a data acquisition system. These are expensive components that generally require high bandwidth, high power amplifiers and fast analog to digital converters. Further, the semiconducting device (the detector material itself, a biased photodiode or a silicon photomultiplier) is subject to large variations in dark current and/or gain and these fundamentally affect the performance of the analog front end circuits. Therefore, it is typically necessary to monitor temperature of the detector circuits and adjust the detector bias voltage as a function of temperature in order to maintain constant gain and detector operating point. Particularly in the case of silicon photomultipliers which operate close to a point of instability, it may be necessary to provide bias voltage to each individual device, which is both an expensive and space consuming process.

Figure 2:
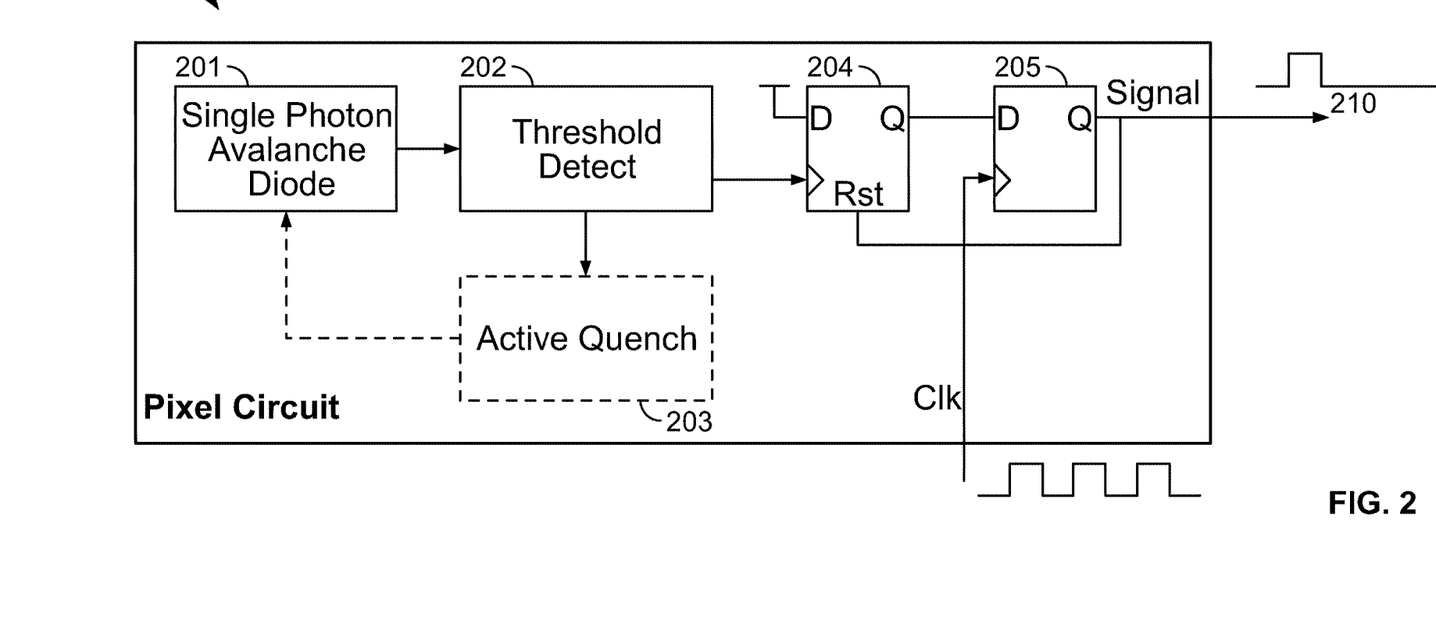
FIG. 2 is a block diagram showing exemplary components for an individual optical photon sensing element, according to one embodiment of the present specification.

In order to address the limitations of known detector systems, the present specification provides a low cost, "direct to digital" sensor, in which the signal generated by the detection medium is converted to digital form directly at the point of signal collection. FIG. 2 illustrates the components required for an individual optical photon sensing element, according to one embodiment of the present specification. Referring to FIG. 2, sensor chip 200 comprises a single photon avalanche diode (SPAD) 201, coupled directly to a threshold detector 202. A single photon avalanche diode is a solid state photodetector in which a single photon can cause sufficient ionization to trigger a measurable avalanche current. The SPAD 201 detects optical photons produced by X-ray interaction in a scintillator material such as LYSO (not shown) that is optically coupled to the sensing element 200. When the SPAD 201 detects a photon, the threshold detector 202 is activated. The output of the threshold detector is fed to a pair of flip-flops or latches 204, 205, which are circuits that have two stable states and can be used to store state information. A corresponding digital pulse 210 is generated. Since one digital pulse is created per interacting optical photon, this device may be referred to as a direct to digital sensor. In one embodiment, the threshold detector 202 is a single field effect transistor (FET) which changes state as a result of charge injection from the SPAD 201. This is a very low power analog front end which is broadly insensitive to temperature changes, since it just responds to the binary event of the SPAD activating or not activating. The binary event is caused by the optical photons and is not dependent on how much gain was produced by the SPAD as long as the SPAD achieves more than threshold gain.

It may be appreciated that the interacting X-ray will produce 10s to 1000's of optical photons depending on the energy deposited in the scintillator material and a fraction of these will reach the active region of the detector. Therefore, if there is an array of SPADs present in the detector, the greater the number of SPADs activated, the higher the deposited energy in the detector.

Further, it may be appreciated that the faster a SPAD can be reset and returned to operational status, the better the linearity of the detector system. Better linearity of the detector implies that the deposited X-ray energy can be resolved more accurately. To achieve fast reset for SPAD and better linearity, in one embodiment, the present system uses an active quench circuit 203. Once an SPAD has activated, it is possible to actively reset it by using an active quench circuit within only a few nanoseconds. The lack of gain element reset is a fundamental issue for known detectors based on silicon photomultipliers and results in serious non-linearity of these detectors in spectral imaging.

In one embodiment, all the signal processing electronics are directly integrated in one sensor chip. In one embodiment, the SPAD and digital electronics are fabricated on the same CMOS substrate. It may be noted that other conventional detectors require the sensitive detection volume, such as a photodiode, to be fabricated using one process (e.g. p-i-n layers) and the electronics to be fabricated using a second process (e.g. CMOS). This makes packaging detectors difficult, noisy and expensive.

The direct to digital mechanism of the sensor of FIG. 2 has several advantages. The sensor is an intrinsically low power device and does not use a noisy front end analog amplifier that consumes a lot of power. This makes the sensor ideal for multi-pixel devices where power management and pixel-to-pixel uniformity otherwise become serious limitations. The sensor is also intrinsically noise free, as it generates no noise other than that associated with photon detection, which is predictable and has a deterministic effect. The lack of electronics noise implies that a very low energy threshold is possible, which is good for resolving low contrast features in multi-energy images.

Figure 3:
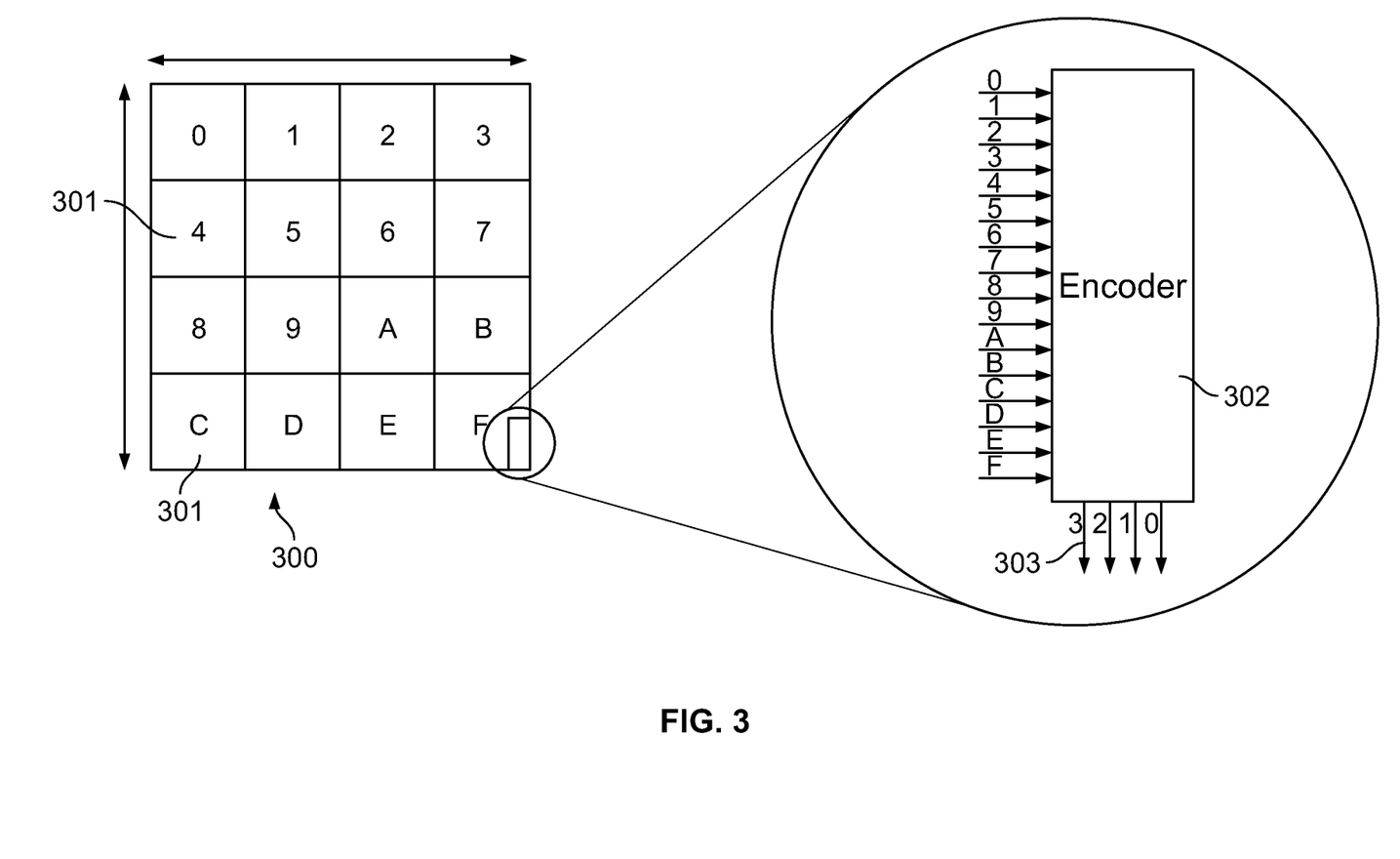
FIG. 3 illustrates a sub-pixel containing 16 pixels which together provide a 4-bit binary output, according to one embodiment of the present specification.

In one embodiment, an array of 16 individual optical photon sensing elements, also known as "pixel circuits" or "pixels", is used to form a sub-pixel. Multiple sub-pixels together form a photo sensor array. FIG. 3 illustrates a sub-pixel containing 16 pixels which together provide a 4-bit binary output. Referring to FIG. 3, photo sensor sub-pixel 300 contains 16 pixels 301, which together provide a 4-bit binary output. The 4-bit binary output is provided by means of encoder 302 into which the output from each of the 16 pixels A to F 301 is fed in order to obtain a 4-bit output signal 303. Since the sub-pixel sensor 300 comprises 16 pixels 301, the sensor 300 can detect up to 16 optical photons at any one time.

Figure 4:
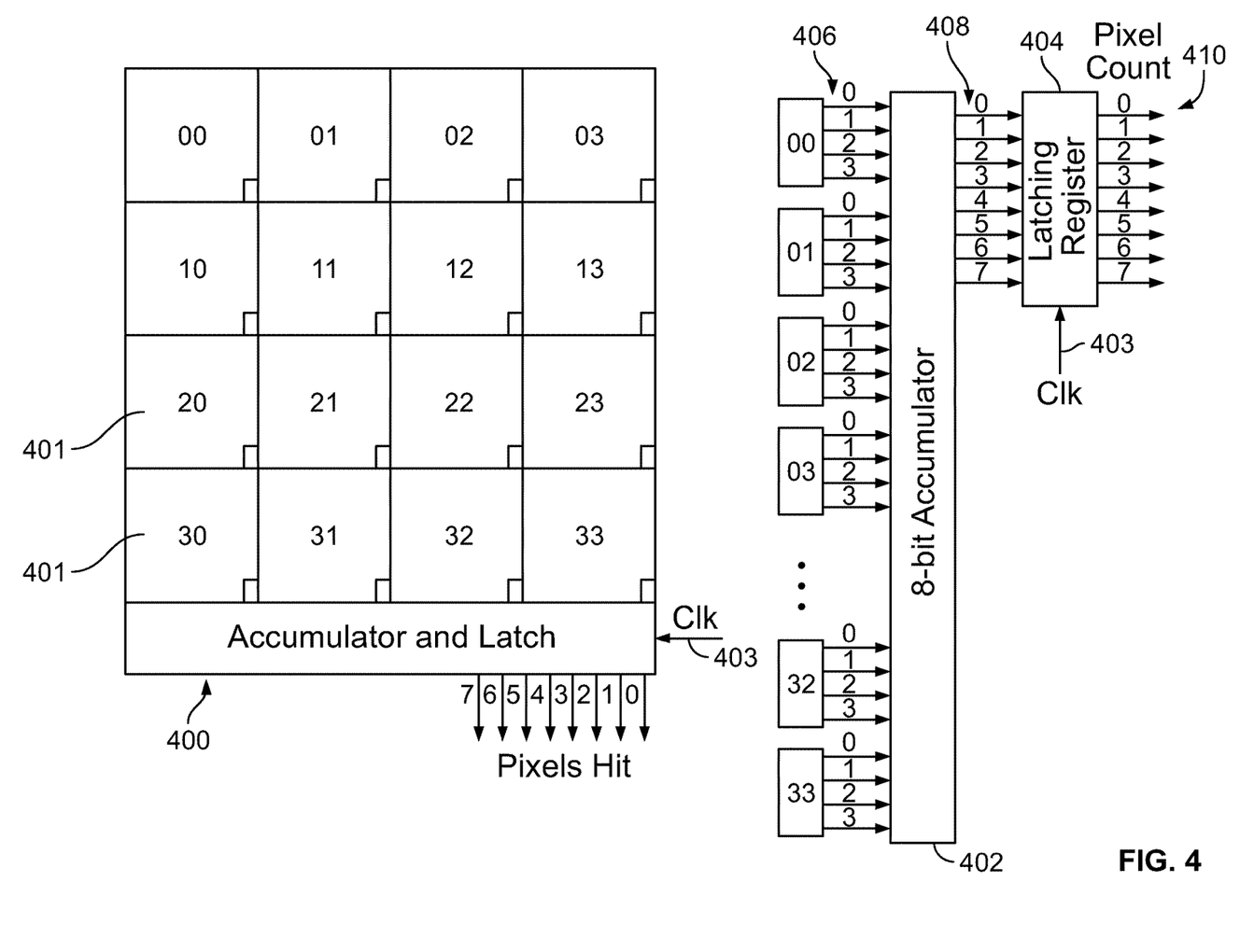
FIG. 4 shows a main pixel array system, which comprises 16 sub-pixels, according to one embodiment of the present specification.

In one embodiment, a larger array is formed by using 16 sub-pixel arrays 300 shown in FIG. 3. FIG. 4 shows a main pixel array system 400, further made up of 16 sub-pixels 401. Each sub-pixel 401 comprises 16 pixel circuits (as shown in FIG. 3). Thus, there are 256 pixels/sensor elements in the array 400. In one embodiment, an 8-bit accumulator 402 is coupled to the sub-pixels 401 and is driven by the same clock 403 that is also used to clock the individual pixel elements of all sub-pixels 401. System 400 further comprises a latching register 404 which is also driven by clock 403. The accumulator 402 sums the output 406 of all sub-pixels 401 once per clock cycle. The output of the accumulator 408 is stored in the latching register 404, which provides the pixel count 410, which is the number of optical photons detected in that pixel per clock period. In one embodiment, a typical clock frequency is in a range of 100 MHz to 500 MHz. It may be noted that the pixel clock frequency is effectively used to vary the gain of the detecting system—the faster the pixel clock, the lower the overall gain of the system and the higher the maximum energy of the X-ray photons that can be detected accurately. Thus, the system 400 acts as a high speed analog to digital converter where the output is the number of optical photons detected per pixel per clock period. The pixel array, accumulator and latch together form a very low power, low noise device that yields a quantitative result which is important in terms of accurate spectral imaging.

Figure 5:
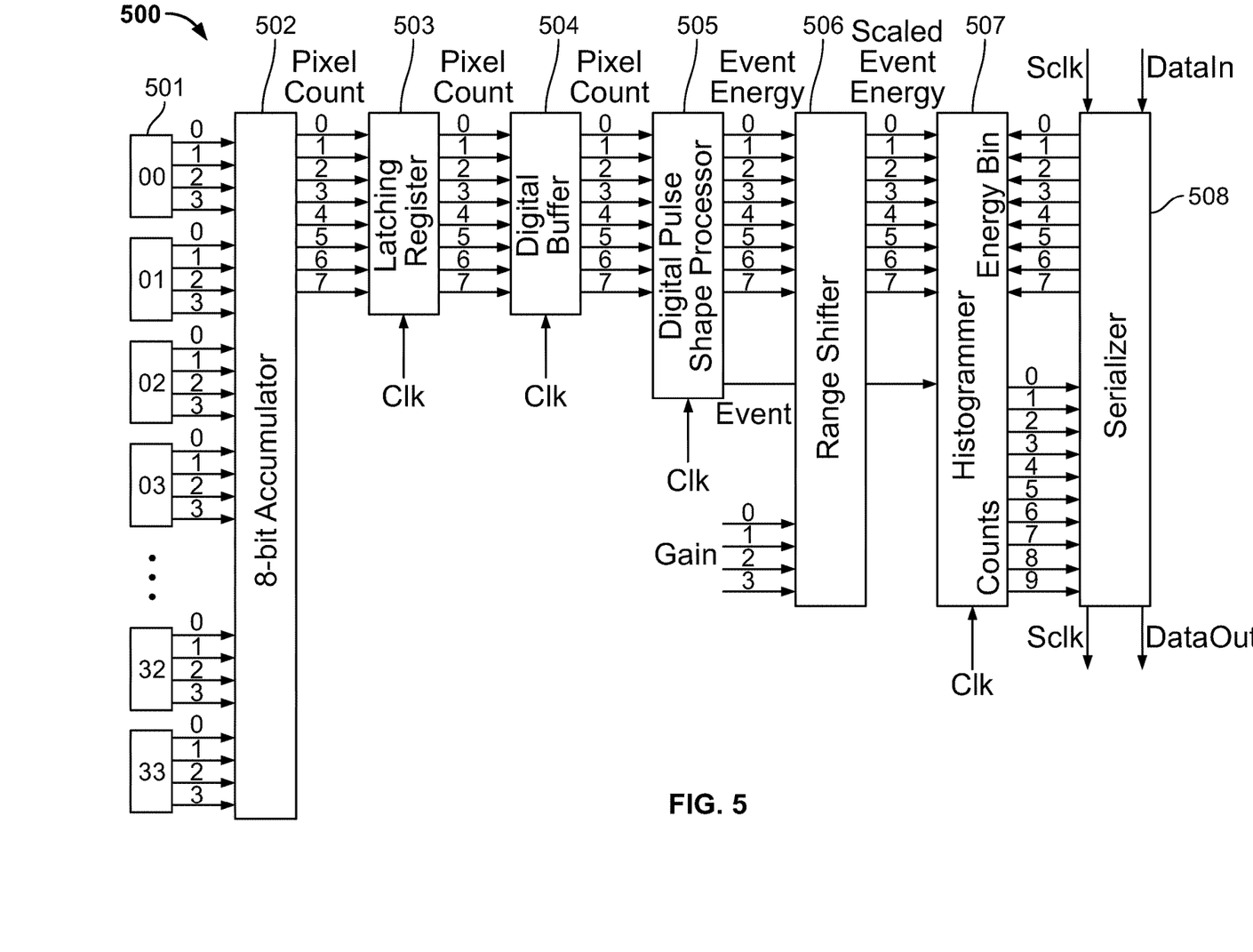
FIG. 5 shows a digital readout chain for the photo sensor, according to one embodiment of the present specification.

In one embodiment, the circuit of FIG. 4 further feeds into a digital pulse processor (DPP), to form a digital readout chain. FIG. 5 shows the digital readout chain 500, according to one embodiment. Referring to FIG. 5, output from a sensor array 501 is fed to an 8-bit accumulator 502, which sums the output of all pixels in the array once per clock cycle. The pixel count from the accumulator 502 is stored in latching register 503, and thereafter buffered in a digital buffer 504, which provides an accurate synchronization between the accumulator/latch and the digital pulse processor (DPP) 505. The DPP 505 searches the time sequence data to find an X-ray pulse and its associated pulse height, which represents a corresponding energy level. In one embodiment, the DPP typically searches first for a transition above a minimum energy threshold (the lower energy discriminator threshold) and then for a transition from a positive to a negative gradient in the output of the digital buffer 504 per clock period. The value in the digital buffer at the time at which the gradient changes from positive to negative is proportional to the energy deposited in the detector by the interacting X-ray and is the value passed to the subsequent range shifter 506.

It may be noted that the clock frequency is chosen to be fast compared to the duration of the light pulse emitted by the scintillator material. For example, for a fast scintillator such as LYSO with optical decay time of typically 40 ns, a clock rate of 200 MHz (5 ns period) provides 8-10 samples per pulse from which to determine the interacting X-ray energy.

Once the pulse height (energy) has been determined by the DPP 505, the energy is appropriately scaled using a range shifter 506. This allows energy spectra to be created at arbitrary resolution depending on the specific requirements of the imaging system, the detection algorithm and the ability of the data acquisition system to handle the associated data flow. Thereafter, a histogrammer 507 generates a histogram of the scaled pulse height (energy), to create an energy spectrum resulting from many interacting X-rays, the number of X-rays being determined by both the X-ray attenuation of the object under inspection and the overall sampling time. In one embodiment, the sampling time ranges from 0.1 ms to 100 ms. The range shifter 506 allows the user to adjust the energy resolution of the system from a single integrated signal to potentially hundreds of finely spaced energy "bins". One of ordinary skill in the art would appreciate that use of more energy bins leads to better energy resolution of the system, but worsens the statistical accuracy of the data present in each bin. Therefore, to achieve a practical imaging system, in one embodiment eight or sixteen energy bins are selected over the range 0-200 keV, as a compromise between energy resolution and statistical noise. Finally, data from the histogrammer is passed through a serializer 508, to pass it to an external device, such as a computer, for subsequent signal analysis and image display.

Figure 6A:
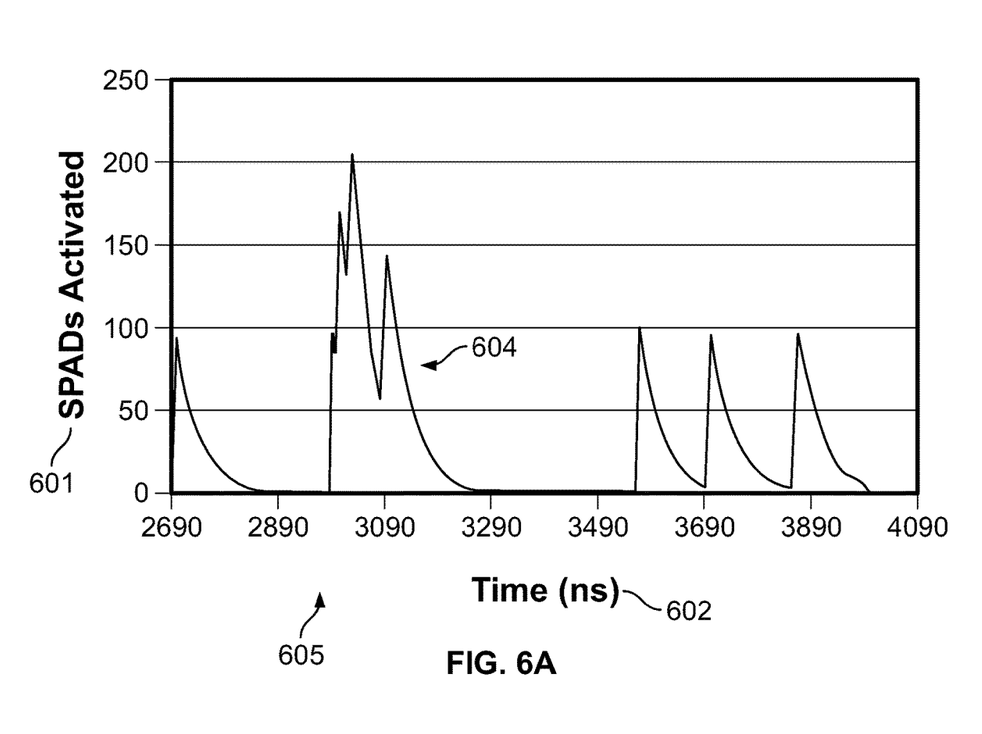
FIG. 6a illustrates a time domain plot of the number of SPADs activated per time period.
Figure 6B:
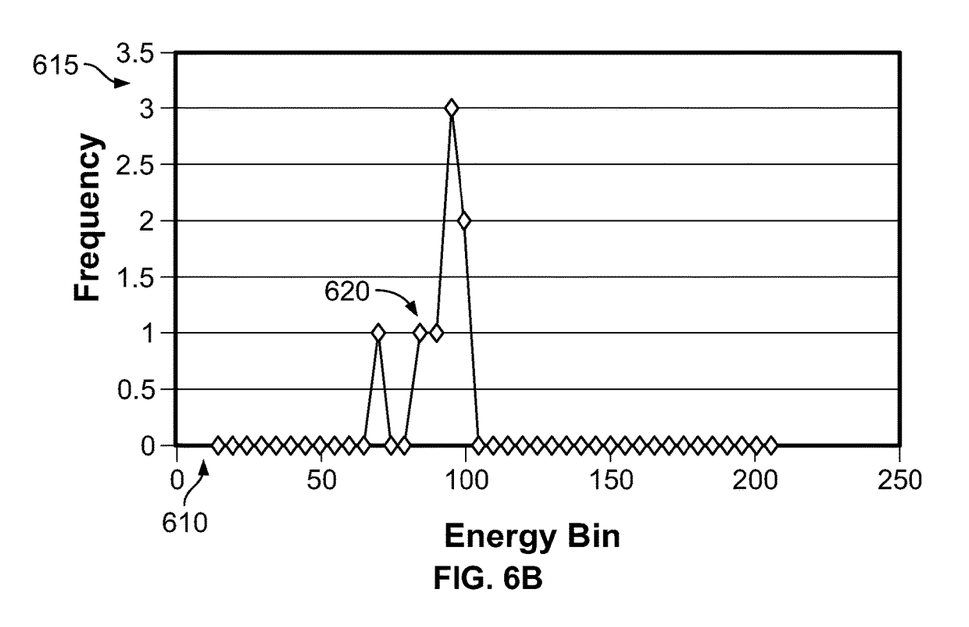
FIG. 6b illustrates an exemplary histogram of an energy spectrum after a simple DPP analysis.

FIGS. 6a and 6b show exemplary quantitative data for X-rays from a 100 keV source, interacting in LYSO scintillator. FIG. 6a illustrates a time domain plot showing the number of SPADs activated per time period. Referring to FIG. 6a, vertical axis 601 of graph 605 shows number of SPADs (refer to FIG. 2) activated per time period shown by the horizontal axis 602. Pulses 604 represent the number of SPADs activated in a time sampling period of 5 nanoseconds (ns) corresponding to a 200 MHz clock.

FIG. 6b illustrates an exemplary histogrammed energy spectrum obtained after a DPP analysis. The graph 620 is obtained by using a pulse height analysis algorithm which comprises starting base of pulse height on transition to positive gradient, and measuring the top of pulse height on transition to negative gradient. Horizontal axis 610 represents energy bins ranging from 0 to 250 KeV, while the vertical axis 615 represents the spectral frequency. As can be seen from the graph 620, the pulse height analysis exhibits reasonable energy resolution. One of ordinary skill in the art would appreciate that advanced DPP analysis methods may be employed with the energy spectrum to further improve its resolution. In one embodiment, a computationally efficient DPP method is based on template matching of a known detector pulse shape scaled to the height of the peak. This scaled template is correlated at each point in time with the actual spectrum and points of strong correlation correspond to interacting pulses.

Figure 7A:
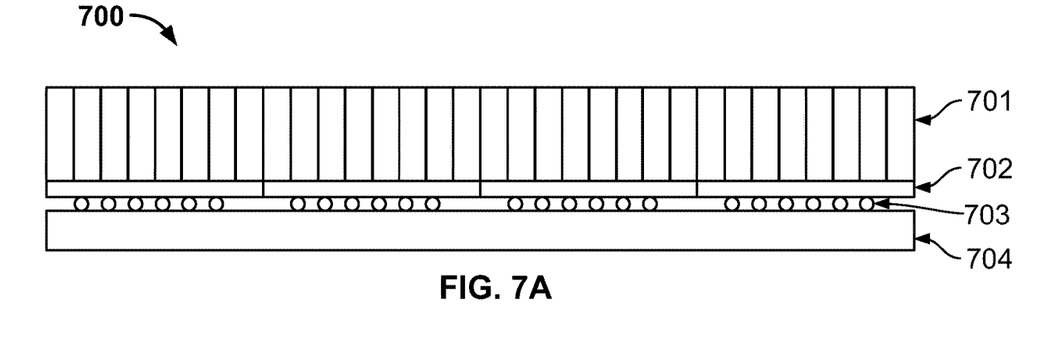
FIG. 7a shows an exemplary embodiment of a sensor chip, according to one embodiment of the present specification.

As mentioned earlier, in one embodiment, the SPAD and all the signal processing electronics are directly integrated in a single sensor chip, and may be fabricated on the same CMOS substrate. FIG. 7a shows an exemplary embodiment of a sensor chip comprising SPAD array and corresponding signal processing electronics. Referring to FIG. 7a, sensor 700 comprises a pixel circuit detector array (refer to FIGS. 2, 3 and 4), together with the corresponding signal processing electronic components as shown in FIG. 5, formed as an application-specific integrated circuit (ASIC) 702. In one embodiment, the ASIC 702 is glued with wire bonds to an FR4 substrate 704. In an alternate embodiment, an alumina ceramic substrate may be employed. In an alternate embodiment, ASIC 702 is connected to the board 704 through silicon vias (TSV) or by means of chip on board (CoB) 703 methods, as known in the art. Also, a scintillator crystal 701 is attached to the sensitive front surface of the pixel detector array 702. In embodiments, various scintillator materials such as $Lu_{1.8}Y_{0.2}SiO_5(Ce)$ (LYSO), lutetium oxyorthosilicate (LSO), gadolinium oxyorthosilicate (GSO), lanthanum Bromide (LaBr) may be coupled with the pixel detector array 702.

Figure 7B:
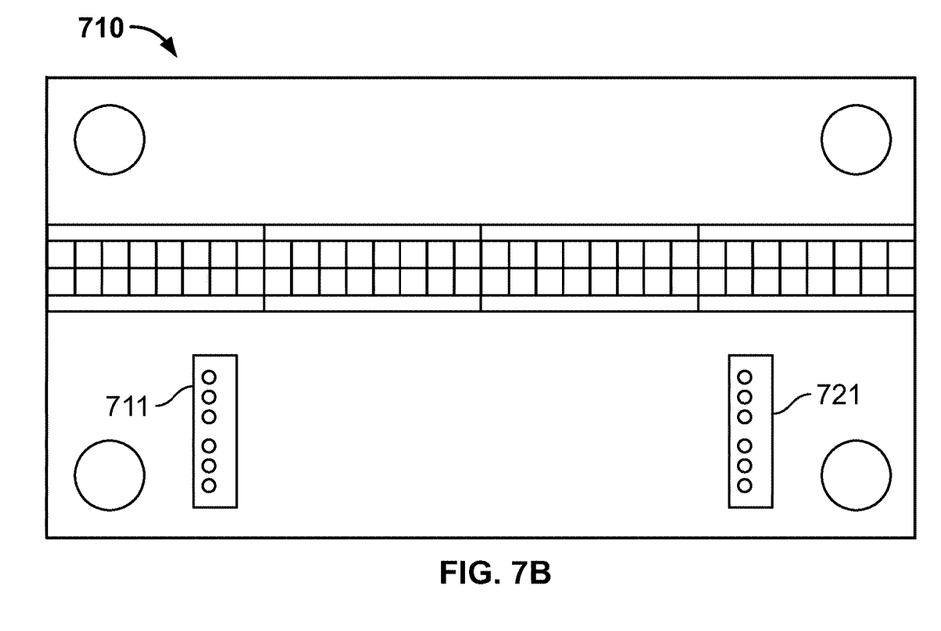
FIG. 7b shows another exemplary embodiment of a sensor chip.

FIG. 7b shows sensor chip 710 with two connectors 711 and 721, which are used to transmit the serial data on and off board and may be used to provide a daisy-chained solution for practical array lengths. FIG. 7b also shows two parallel rows of detector elements 731 and 741. In this embodiment, the object to be inspected is sampled at a rate equal to one pixel per projection and the data from the leading edge pixels is summed with data from the trailing edge pixels from the next projection. This maintains spatial resolution in the detected image at the single pixel level but results in a root two improvement in signal-to-noise ratio and hence improvement in ultimate penetration performance. It shall be obvious to one of ordinary skill in the art that alternate pixel configurations can be selected, such as but not limited to rectangular pixels, offset linear arrays, 14 and arrays with crystals of varying heights. In one embodiment, the horizontal array length is about 650 mm and its vertical height is about 450 mm, and the number of pixels is 1375. In one embodiment, the pixel dimension is about 0.8 mm×0.8 mm×2.0 mm, and the detector array exhibits an X-Ray count rate up to 5 MHz/mm².

Figure 8:
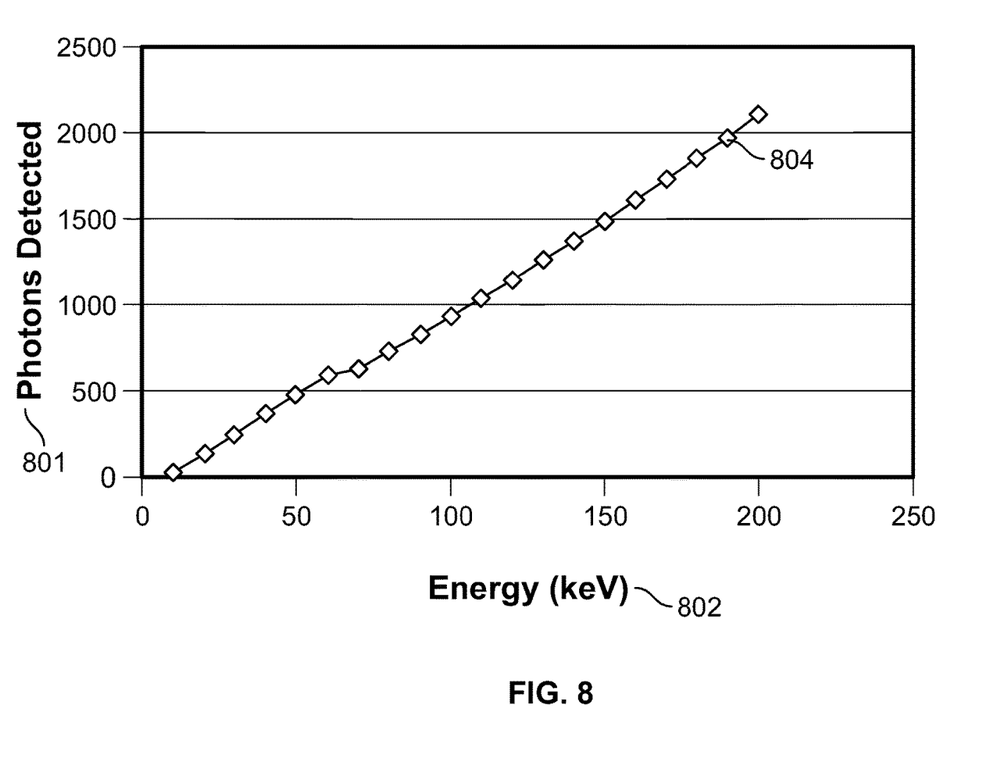
FIG. 8 is a graph illustrating the relationship between total number of optical photons detected per interacting X-ray and energy of the incident X-rays, according to one embodiment of the present specification.

FIG. 8 is a graph illustrating the relationship between total number of optical photons detected per interacting X-Ray and energy of the incident X-rays by using the detector illustrated in FIGS. 4, 5 and 7. Y-axis 801 represents total number of optical photons detected per interacting X-Ray and X-axis 802 represents energy of the incident X-rays in KeV. In the present example, the incident X-ray spectrum is a broadband bremsstrahlung spectrum ranging from from zero to a maximum energy of 250 KeV. The obtained plot 804 illustrates a near linear relationship between the number of photons detected and the incident X-ray energy.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:

1. A multi-energy detector for detecting incident radiation, comprising:
  a scintillator material adapted to convert the incident radiation into a plurality of optical photons;
  an array of pixel circuits, wherein each pixel circuit comprises a photon avalanche diode (SPAD) coupled to and in electrical communication with a threshold detector, wherein each SPAD is optically coupled to the scintillator material and adapted to generate a current in response to detecting one or more optical photons, and wherein the threshold detector is configured to generate a digital pulse in response to said current;
  processing electronics for processing the digital pulse from each pixel circuit in said array of pixel circuits and converting said digital pulse into an energy profile of the incident radiation; and a clock configured to generate a variable frequency and configured to be in electrical communication with the array of pixel circuits and the processing electronics, wherein a gain of the multi-energy detector is adapted to vary based on the variable frequency.

2. The multi-energy detector of claim 1, wherein each of said pixel circuits further comprises an active quench circuit, wherein the active quench circuit is configured to reset said SPAD.

3. The multi-energy detector of claim 1, wherein the scintillator material is LYSO crystal.

4. The multi-energy detector of claim 1, wherein said array of pixel circuits and said processing electronics are fabricated on a single CMOS substrate.

5. The multi-energy detector of claim 1, wherein said processing electronics includes an accumulator configured to generate a pixel count wherein said pixel count is transmitted to a latching register.

6. The multi-energy detector of claim 5 wherein said latching register is configured to receive said pixel count from said accumulator, store said pixel count, and send said pixel count to a digital buffer.

7. The multi-energy detector of claim 6 wherein said digital buffer is configured to receive said pixel count from said latching register, buffer said pixel count, and send said buffered pixel count to a digital pulse processor.

8. The multi-energy detector of claim 7 wherein said digital pulse processor is configured to receive said buffered pixel count from said digital buffer, find a specific energy value, and send said energy value to a range shifter.

9. The multi-energy detector of claim 8 wherein said range shifter is configured to receive said energy value from said digital pulse processor, scale said energy value, and send said scaled energy value to a histogrammer.

10. The multi-energy detector of claim 9 wherein said histogrammer is configured to receive said scaled energy value from said range shifter, generate a histogram of said scaled energy value to create energy spectrum data, and send said energy spectrum data to a serializer.

11. The multi-energy detector of claim 10 wherein said serializer is configured to receive said energy spectrum data from said histogrammer and pass said energy spectrum data to an external device for signal analysis and image display.

12. The multi-energy detector of claim 8, wherein the digital pulse processor is configured to find a specific energy value by searching time sequence data to find an X-ray pulse and its associated pulse height, wherein the pulse height represents a corresponding energy level.

13. The multi-energy detector of claims 1, wherein the frequency of the clock is in the range of 100 MHz to 500 MHz.

* * * * *